United States Patent
Jerry

[11] Patent Number: 5,345,788
[45] Date of Patent: Sep. 13, 1994

[54] GRASS CUTTER AND LEAF BLOWER BLADE

[76] Inventor: Frederick L. Jerry, 21331 Kipling St., Oak Park, Mich. 48237

[21] Appl. No.: 972,573

[22] Filed: Nov. 9, 1992

[51] Int. Cl.⁵ ............................................. A01D 34/82
[52] U.S. Cl. ...................................... 56/255; 56/295; 56/DIG. 17
[58] Field of Search ........ 56/255, 295, 17.5, DIG. 17, 56/DIG. 20; 30/276, 347, 355

[56] References Cited
U.S. PATENT DOCUMENTS

| | | | |
|---|---|---|---|
| 3,087,298 | 4/1963 | Phillips, Sr. | 56/295 |
| 3,474,608 | 10/1969 | Frick | 56/295 |
| 4,368,610 | 1/1983 | Aono | 56/295 |

*Primary Examiner*—Terry Lee Melius

[57] ABSTRACT

In the invention the blade is an "Z" like shaped plate consisting of two pitched or inclined edges for cutting grass with two opposite curved sides having series of vanes disposed on their top surface that increase the output of air power of the said blade, and a disposed through hole that accommodate the power lawn mower blade shaft for securing the blade thereto.

2 Claims, 1 Drawing Sheet

GRASS CUTTER AND LEAF BLOWER BLADE

SPECIFICATION

My invention of an Grass Cutter And Leaf Blower Blade relate to improvements in power lawn mower blade that cut grass and blow the clippings into the grass catcher or through an combination Leaf Blower And Deflector; the objects of my invention and improvements are, first, to devise a power lawn mower blade that is an combination Grass Cutter And Leaf Blower Blade; to devise means of increasing the out-put of air of an lawn mower blade.

TECHNICAL FIELD

The invention relates to improvements in power lawn mower blades used in connection with consumers and commercial lawn equipment, in particular lawn mower Leaf Blower And Deflector U.S. Pat. No. 5,033,260.

The present power lawn mower blade was designed for the sole purpose to cut grass and make sufficient air power to blow the clippings into the grass catcher or through a deflector attached to the lawn mower, not for blowing leaves.

Although the present power lawn mower is used for the purpose, with limit success, because most leaves are not blown away, but grinded into small pieces, some of which is blown through the deflector with the majority deposit on the ground. This call for a minimum of two passes over the same area to pick-up those remaining small pieces of leaves if possible These disadvantages are overcome by my invention of an "Z" like shaped blade provided with vanes as means of increasing the blade air power and consequently that of the power lawn mower when the blade is connected thereto.

BACKGROUND ART

The background art or Prior Art power lawn mower blade is rectangular in shape with two pitched or inclined edges for cutting grass disposed on two of its right angle sides, and provided with a through hole for its attachment to a power lawn mower blade shaft, with its sole purpose and intent to cut grass and discharge the grass clippings into the grass catcher or through a deflector. Therefore, air created naturally by the Prior Art power lawn mower blade spinning and with its ridge for discharging grass clippings, is not only inefficient for blowing leaves, its incapable of producing air output for blowing leaves comparable to leaf blowing machines. These disadvantages are overcome by my invention of an "Z" like shaped blade with two curved sides that enable a series of vanes to be disposed on their surface that increase the blade out-put of air power.

DISCLOSURE OF THE INVENTION

In accordance with the present invention of an rectangular shaped power lawn mower blade constructed with two right angles having two inclined edges A1 and a through hole B, I provide an improved lawn mower blade shaped like a "Z" with two pitched or inclined edges 2, and on its opposite curved sides a series of vanes 4 is disposed to increase the said plate 1 air output power, a through hole to accommodate the power lawn mower blade shaft.

My invention improvements and advantages make possible air power for blowing leaves, comparable to machines made purposely for blowing leaves.

BRIEF DESCRIPTION OF THE DRAWINGS

The detail of my invention will be described in the connection with the accompanying drawings, in which.

BEST MODE FOR CARRYING OUT THE INVENTION

Figure 1:
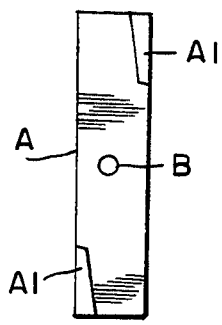
FIG. 1, is an elevation view of the Prior Art power lawn mower blade A provided with two pitched or inclined edges A1 and a shaft hole B without my invention and new improvements.
Figure 2:
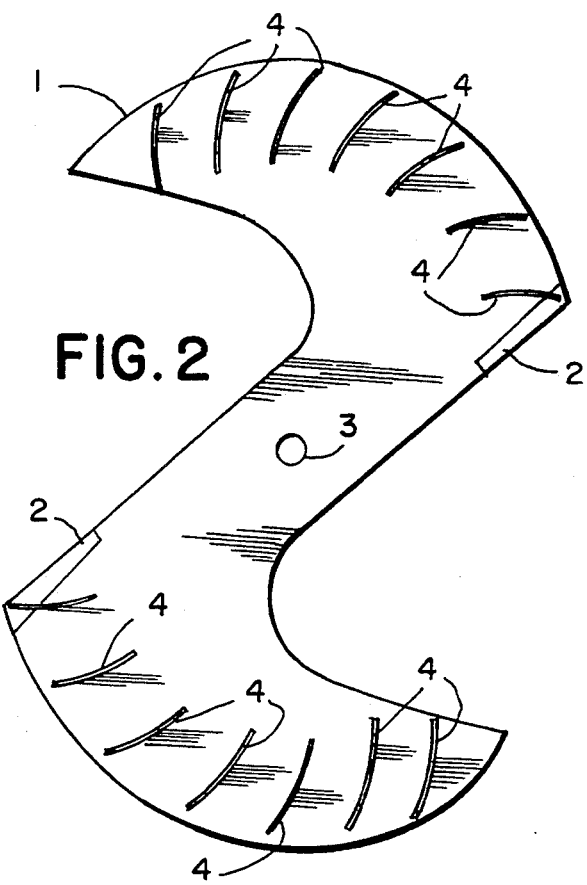
FIG. 2, is an elevation view of my invention and new improvements.
Figure 3:
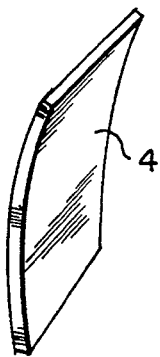
FIG. 3, is an perspective view of a vane of my invention.
Figure 4:
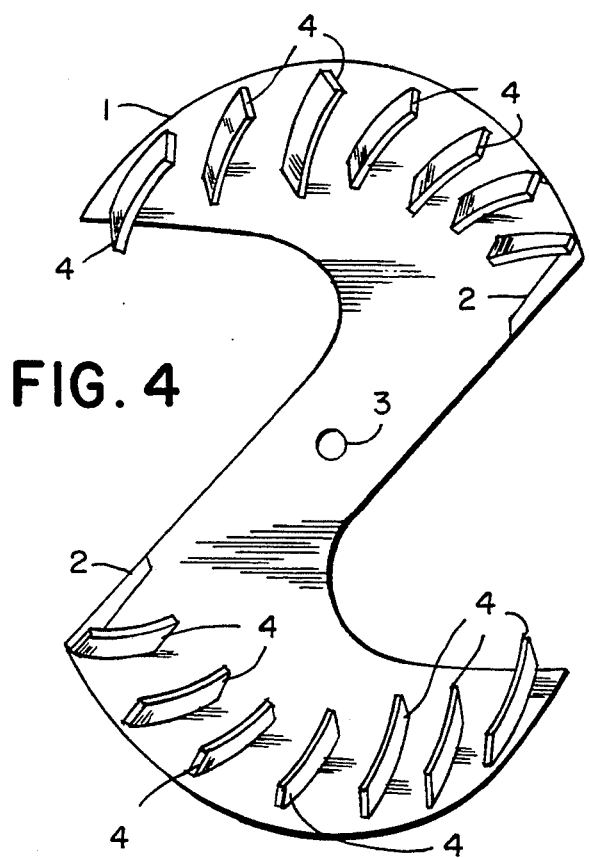
FIG. 4, is an perspective view of my invention.

The invention and improved power lawn mower blade consist of a "Z" like shaped plate 1 with two pitched or inclined edges 2, and on its opposite curved sides a series of vanes 4 shown in FIG. 2, 3 and 4 that are slightly curved and rectangular shaped to increase the air output of the said plate 1. The said two pitched or inclined edges 2, are in every way identical to the pitched or inclined edges A1 disposed on the right angles of the Prior Art shown in FIG. 1 of the drawings. The plate 1 also has a through hole 3 disposed therein for the accommodation of the power lawn mower blade shaft. The said through hole 3 is not only identical to the shaft hole B in the PRior Art, both holes are disposed identical in their respective blades.

I claim:

1. A grass cutter and leaf blower blade comprising:
a generally "Z" shape plate, said plate including a substantially straight intermediate portion having a mounting hole therethrough and substantially parallel sides, end portions, integral with said intermediate portion and extending rearward with respect to the direction of travel of the blade, said end portions having arcuate outside edges each said parallel side, at the intersection with said respective end portion in said forward direction of travel of said blade, including a pitched and inclined cutting edge section and blower means mounted on the end portions.

2. The grass cutter and leaf blower blade of claim 1 wherein the blower means includes a plurality of vanes disposed on said end portions.

* * * * *